(12) United States Patent
Page et al.

(10) Patent No.: US 10,953,778 B2
(45) Date of Patent: Mar. 23, 2021

(54) ARMREST AND SEAT ARRANGEMENT FOR A VEHICLE

(71) Applicant: Volvo Car Corporation, Gothenburg (SE)

(72) Inventors: Robin Page, V. Frölunda (SE); Peter Alexandersson, Kungsbacka (SE)

(73) Assignee: Volvo Car Corporation, Göteborg (SE)

( * ) Notice: Subject to any disclaimer, the term of this patent is extended or adjusted under 35 U.S.C. 154(b) by 12 days.

(21) Appl. No.: 16/546,419

(22) Filed: Aug. 21, 2019

(65) Prior Publication Data
US 2020/0094718 A1 Mar. 26, 2020

(30) Foreign Application Priority Data
Sep. 21, 2018 (EP) .................................... 18195926

(51) Int. Cl.
  *B60N 2/70* (2006.01)
  *B60N 2/75* (2018.01)
  *A47C 7/54* (2006.01)
(52) U.S. Cl.
  CPC .............. *B60N 2/777* (2018.02); *A47C 7/543* (2013.01); *B60N 2/753* (2018.02)
(58) Field of Classification Search
  CPC .......... B60N 2/777; B60N 2/75; B60N 2/753; B60N 2/763; A47C 7/543; A47C 7/54
  USPC .................................................... 297/411.37
  See application file for complete search history.

(56) References Cited

U.S. PATENT DOCUMENTS

| 4,628,552 A * | 12/1986 | Magistretti .......... A47C 19/022 5/52 |
| 5,964,497 A * | 10/1999 | Wiles ..................... B60N 2/783 296/153 |
| 2007/0278838 A1 * | 12/2007 | Davis ..................... A47C 7/543 297/411.32 |
| 2008/0203803 A1 * | 8/2008 | Chi ......................... A47C 7/50 297/411.37 |

(Continued)

FOREIGN PATENT DOCUMENTS

| DE | 9103954 U1 | 6/1991 |
| DE | 10029926 A1 | 1/2002 |

(Continued)

OTHER PUBLICATIONS

Apr. 25, 2019 European Search Report issue on International Application No. EP18195926.

*Primary Examiner* — Mark R Wendell
(74) *Attorney, Agent, or Firm* — Clements Bernard Walker; Christopher L. Bernard (57) ABSTRACT

The present disclosure relates to an armrest (9) for a seat arrangement (1) of a vehicle or a vessel. The armrest is foldable between a use position and a fold-away position and comprises a pad portion (11, 11'), an arm portion (13), a first hinge (15) having a first hinge axis and a second hinge (17, 17') having a second hinge axis. The pad portion is elongate along a longitudinal axis. The first hinge rotatably connects the pad portion and a first end portion (19) of the arm portion. The second hinge rotatably connects a second end portion (21) of the arm portion to the seat arrangement. The first hinge axis and the second hinge axis have extension directions being parallel or substantially parallel to the longitudinal axis of the pad portion.

19 Claims, 11 Drawing Sheets (56) References Cited

U.S. PATENT DOCUMENTS

2008/0224513 A1    9/2008  Zink et al.
2018/0281725 A1*  10/2018  Nagasawa ................ B60N 2/79
2019/0106017 A1*   4/2019  Marubayashi ....... B60N 2/3047

FOREIGN PATENT DOCUMENTS

FR         2923762 A1    5/2009
JP       2001321243 A   11/2001

* cited by examiner

ARMREST AND SEAT ARRANGEMENT FOR
A VEHICLE

CROSS-REFERENCE TO RELATED APPLICATION

The present disclosure claims the benefit of priority of co-pending European Patent Application No. 18195926.3, filed on Sep. 21, 2018, and entitled "ARMREST AND SEAT ARRANGEMENT FOR A VEHICLE," the contents of which are incorporated in full by reference herein.

TECHNICAL FIELD

The present disclosure relates to an armrest and to a seat arrangement for a vehicle or a vessel.

BACKGROUND

In order to provide comfort for a user of a seat arrangement of a vehicle, the seat arrangement may be provided with an armrest offering a comfortable support for an elbow and/or a forearm of the user of the seat arrangement when in a use position. Moreover, often the armrest may be folded or rotated away to a fold-away position, in order to allow easy access into the seat arrangement for the user.

Patent document JP 2001321243 A1 discloses a seat arrangement for a vehicle. The armrest is pivotable by about 90 degrees around an axis extending in the longitudinal direction of the vehicle. However, the armrest is also rotatable another 90 degrees around an axis extending in the transverse direction of the vehicle within the backrest, such that it can be folded out of the way.

Patent document FR 2 923 762 A1 discloses an armrest, having a bearing arm carried by a support arm that includes a joint pivoting around a fixed horizontal axis for permitting the bearing arm to pass from a deployed position to a retracted position. The bearing arm is horizontal and parallel to a longitudinal direction of the vehicle in the deployed position. The axis is placed laterally under the base of a seat, such that the bearing arm and the support arm are placed under the seat in the retracted position. The horizontal axis is placed proximate to the rear of the base.

However, by mounting the armrest to or within the backrest, it follows that the armrest will accompany the backrest in any displacement thereof, e.g. when folding it forwards, which sometimes is undesirable. There is therefore a desire to provide an armrest for use in vehicles, which armrest is easy to fold away and yet is independent of the backrest, i.e. the armrest will not follow the backrest in a displacement thereof.

SUMMARY

The object of the present disclosure is to overcome or ameliorate at least one of the disadvantages of the prior art, or to provide a useful alternative.

The present invention relates to an armrest for a seat arrangement of a vehicle or a vessel. The armrest is foldable between a use position and a fold-away position and comprises a pad portion, an arm portion, a first hinge having a first hinge axis and a second hinge having a second hinge axis. The pad portion is elongate along a longitudinal axis. The first hinge rotatably connects the pad portion and a first end portion of the arm portion. The second hinge is located at a second end portion of the arm portion, being opposite to the first end portion. The second hinge rotatably connects the second end portion of the arm portion to the seat arrangement. The first hinge axis and the second hinge axis have extension directions being parallel or substantially parallel to the longitudinal axis of the pad portion.

The armrest is intended to be mounted to, or to form a part of, a seat arrangement of a vehicle or a vessel. The vehicle may be a car, a bus, a tram or a train. The vessel may be a ferry or an aeroplane. Such a vehicle or vessel is used to transport one or more human beings, which are to be seated in one or more seat arrangements as seat occupants. The armrest according to the invention may be mounted to an existing seat arrangement or may form part of a seat arrangement according to the invention, which is further described herein.

The armrest may assume the use position, offering a comfortable support for an elbow and/or a forearm of the user of the seat arrangement, and the fold-away position, making it easier to pass the seat arrangement e.g. to access a seat of the seat arrangement or to access another seat row located behind the seat arrangement. The armrest is displaceable between these two positions. It may also assume one or more positions therebetween.

The pad portion offers a comfortable support for an elbow and/or a forearm of a user of the seat arrangement. As the name says, the pad portion usually comprises a padded surface, which is comfortable for the user, but it may also be unpadded. The pad portion is elongate along a longitudinal axis and thus has a relatively long extension along the longitudinal axis, typically being in the range of from 10 to 50 cm or from 20 to 40 cm, the longitudinal axis of the pad portion coinciding or substantially coinciding with a length direction of the seat arrangement and in turn with a longitudinal direction of the vehicle or vessel.

The arm portion spans the distance between the two hinges, i.e. between the first hinge and the second hinge, and thereby contributes to giving the armrest the desired height as seen in relation to a floor of the vehicle or vessel.

The first hinge is intended for rotation of the pad portion in relation to the arm portion. The first hinge may be constituted by a single continuous hinge of the type often known as a piano hinge. However, other configurations of the first hinge would also be feasible, e.g. two or more shorter hinges.

The second hinge is intended for rotation of the arm portion in relation to the rest of the seat arrangement. It is located at the opposite end portion of the arm portion as compared to the first hinge. In the use position, the first hinge is substantially vertically above the second hinge. In the fold-away position, the first hinge is substantially vertically below the second hinge.

The extension directions of the first hinge axis and the second hinge axis are parallel or substantially parallel to each other. When the armrest is mounted to a seat arrangement in the vehicle, the extension directions of the first hinge axis and the second hinge axis typically run in the length direction of the seat arrangement and thus also in the longitudinal direction of the vehicle. Further, the extension directions are typically parallel or substantially parallel to a floor of the vehicle or vessel. This differs from prior art solutions, in which the armrest is rotatable around an axis extending instead in a transverse direction of the vehicle, often located within the backrest of the seat arrangement, see e.g. the armrest of the above-mentioned JP 2001321243 A1.

The armrest according to the invention is easy to reach when desired and to fold away when not desired any more. There is no need for a seat occupant to turn his or her back in order to displace the armrest, as is often the case for existing armrests having a transverse rotation axis, e.g. like the armrest disclosed in JP 2001321243 A1. The armrest according to the invention also makes it easier to access the seat arrangement to be seated and to pass the seat arrangement to e.g. access another seat row located behind the seat arrangement.

According to the invention, it is further possible to provide an armrest which offers generous support in the use position, but which is flat and out of the way in the fold-away position. In addition, the width of the backrest of the seat arrangement does not risk to be compromised by the armrest, as might be the case for a transverse rotation axis located in the backrest, cf. the armrest disclosed in JP 2001321243 A1.

Moreover, the armrest according to the invention remains at the same level when adjusting the backrest, e.g. when changing the inclination of the backrest. Thereby it is possible to maintain the armrest at the same level as a fixed armrest on the other side of the seat arrangement, e.g. in or at a door or a wall of the vehicle or vessel. The armrest is directly or indirectly attachable to the seat arrangement independently of the backrest. Accordingly, the armrest is attachable to a component of the seat arrangement, which is independent of the backrest, i.e. which does not follow the backrest during a displacement thereof. The armrest may for example be attached to a recliner bracket, a seat basin, a seat frame or a seat rail comprised in the seat arrangement. By making the armrest independent of the backrest, it is possible to recline the backrest without affecting the angle of the armrest in relation to the floor of the vehicle. Also forwards folding of the backrest is possible without interfering with the armrest.

The fold-away position of the armrest may be utilized to prevent a risk of a seat occupant being injured in a side impact by causing the armrest to be automatically displaced to the fold-away position, in the event of a detected or imminent side impact or a roll-over accident. Purely as an example, the armrest may be displaced by an actuator associated with a safety system of the vehicle to the fold-away position when a side force exceeds a preselectable level.

As an alternative or complement, the armrest may, in case of a side impact or a roll-over accident, be folded away by the seat occupant himself/herself pressing on the armrest with a force above a pre-selectable limit. Since the armrest is folded away, the risk of potential injuries to the stomach, ribs and/or spine of the seat occupant is reduced or preferably avoided.

The extension directions of the first hinge axis and the second hinge axis may differ by less than 20 degrees, preferably less than 15 degrees, more preferably less than 10 degrees and most preferably less than 5 degrees. Purely as an example, the extension directions may be parallel, i.e. having an angular difference of 0 degrees. Purely as another example, the extension directions may be chosen such that a selected orientation of the second hinge axis may make a side surface of the pad portion of the armrest, in the fold-away position of the armrest, extend in a direction being parallel or substantially parallel to an upper surface of the seat portion. In particular, it may be desirable that the side surface of the pad portion is parallel or substantially parallel to an upper surface of the part of the seat portion being closest to the pad portion. In that case, the angular difference between the two hinge axes may be in the range of 0-10 degrees, or 2-6 degrees, e.g. about 4 or 5 degrees. This corresponds to that the upper surface of the seat portion typically is angled by about 10 degrees.

The pad portion is displaceable from the use position of the armrest, in which the pad portion has a horizontal or substantially horizontal support surface, to a substantially vertical position of the support surface used in the fold-away position of the armrest. The first hinge may be configured for a first maximum rotation angle $\alpha_{max}$ describing the rotation of the pad portion in relation to the arm portion, with $70°<\alpha_{max}<110°$, preferably $80°<\alpha_{max}<100°$, more preferably $85°<\alpha_{max}<95°$, most preferably $\alpha_{max}$ being about 90°.

The pad portion may comprise a cavity, the first hinge axis being accommodated within the cavity, such that the first hinge is hidden from view for a user of the seat arrangement.

The second hinge is configured to allow rotation of the arm portion from the use position of the armrest, in which the arm portion extends vertically upwards or substantially vertically upwards from the second hinge, to the fold-away position of the armrest, in which the arm portion extends vertically downwards or substantially vertically downwards from the second hinge. The second hinge may be configured for a second maximum rotation angle $\beta_{max}$ defining the rotation of the arm portion in relation to the rest of the seat arrangement, with $150°<\beta_{max}<190°$, preferably $165°<\beta_{max}<185°$, more preferably $170°<\beta_{max}\leq180°$.

The first hinge and the second hinge may interspaced by a smallest distance being at least 5 cm, preferably at least 7 cm, more preferably at least 10 cm. This distance defines the height of the arm portion when the armrest in in the use position.

The armrest may comprise a locking mechanism configured to secure the armrest in at least one of the use position and the fold-away position, preferably in both. The locking mechanism may also be utilized to lock the pad portion in the use position of the armrest, i.e. to retain the pad portion horizontally or substantially horizontally. As an alternative or a complement, an additional locking mechanism may be provided for the pad portion, e.g. a magnetic coupling.

The locking mechanism may comprise a first portion located at the pad portion of the armrest, a second portion operating at the second hinge and a linkage system connecting the first and second portions. By utilizing such a locking mechanism, a rotation of the pad portion about the first hinge, made by e.g. a user of the seat arrangement, may be utilized to influence a possible movement at the second hinge.

The first portion of the locking mechanism may be operated by rotating the pad portion by an angle $\alpha$ around the first hinge. Accordingly, the support surface of the pad portion is moved to an essentially vertical position facing inwards, i.e. towards a body of the user of the seat arrangement. The pad portion may be rotated in two steps, with the last step of the rotation providing a movement which is used to unlock the locking mechanism. The first step of the rotation may encompass an angle in the range of from 5° to 85°, preferably from 30° to 80°, more preferably from 50° to 75°, most preferably from 60° to 70°. The second step may then encompass the remaining angle portion up to the first maximum rotation angle $\alpha_{max}$.

The above-described locking mechanism represents one way of locking and unlocking the armrest. Alternatively, a release button or a pull strap may be provided for locking and unlocking the armrest. As a further alternative, the armrest may be biased towards the use position and the fold-away position, respectively. In that case there would be no firm locked state of the locking mechanism. Instead, an increased force would be used to displace the armrest from the use position and the fold-away position, respectively. It would also be possible to perform the transition of the armrest between the use position and the fold-away position electrically.

The armrest may further comprise a hinge bracket, the second hinge rotatably connecting the second end portion of the arm portion to the hinge bracket, the hinge bracket being configured for attachment to the seat arrangement. The hinge bracket provides attachment for the second hinge. By using the hinge bracket, the armrest according to the invention may easily be mounted to an existing vehicular seat by attaching the hinge bracket to a portion of the seat, e.g. to a recliner bracket, a seat basin, a seat frame or a seat rail comprised in the seat arrangement.

The present invention also relates to a seat arrangement for a vehicle or a vessel. The seat arrangement comprises a seat and at least one armrest according to the invention. The seat comprises a seat portion and a backrest. The backrest may have an adjustable inclination and/or be forwards foldable.

The armrest is directly or indirectly attachable to the seat independently of the backrest. The armrest may for example be attached to a recliner bracket, a seat basin, a seat frame or a seat rail comprised in the seat arrangement. By making the armrest independent of the backrest, it is possible to recline the backrest without affecting the angle of the armrest in relation to the floor of the vehicle. Also forwards folding of the backrest is possible without interfering with the armrest. Further, the example components of the seat arrangement mentioned above for attachment have in common that they allow the armrest to follow any longitudinal adjustment of the seat in relation to the floor.

The extension directions of the first hinge axis and the second hinge axis may be substantially in a length direction of the seat arrangement or in the length direction of the seat arrangement, which typically corresponds to the longitudinal direction of the vehicle when mounted in the vehicle.

The pad portion of the armrest may, in the fold-away position, extend in a direction being parallel or substantially parallel to a floor attachment portion comprised in the seat arrangement, e.g. a seat rail.

A side surface of the pad portion of the armrest may, in the fold-away position of the armrest, extend in a direction being parallel or substantially parallel to an upper surface of the seat portion, preferably aligned with the upper surface thereof. Thereby the armrest will form a continuation of the seat portion. In particular, it may be desirable that the side surface of the pad portion is parallel or substantially parallel to an upper surface of the part of the seat portion being closest to the pad portion.

The backrest may be forwards foldable to a folded position, e.g. by the backrest being pivotable around a bolt in the recliner bracket, by an angle in the range of 20-60 degrees, or 30-50 degrees, e.g. about 40 degrees, wherein the pad portion is shaped such that when the armrest is in the fold-away position and the backrest is in the folded position, a lowest portion of the pad portion is at a vertical level being higher than or equal to a lowest part of the seat arrangement. The extension of the pad portion may be adapted, e.g. shortened to avoid contact with the floor. As a complement or an alternative, an outer corner of the pad portion may be chamfered. Thereby, the backrest can be folded without the pad portion being hindered by the floor of the vehicle or vessel, due to the pad portion being shaped such that it does not project lower than the lowest part of the seat arrangement. This provides easier access to an additional seat arrangement being located behind the seat arrangement.

The present invention further relates to a vehicle or vessel comprising a seat arrangement according to the invention.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 1:
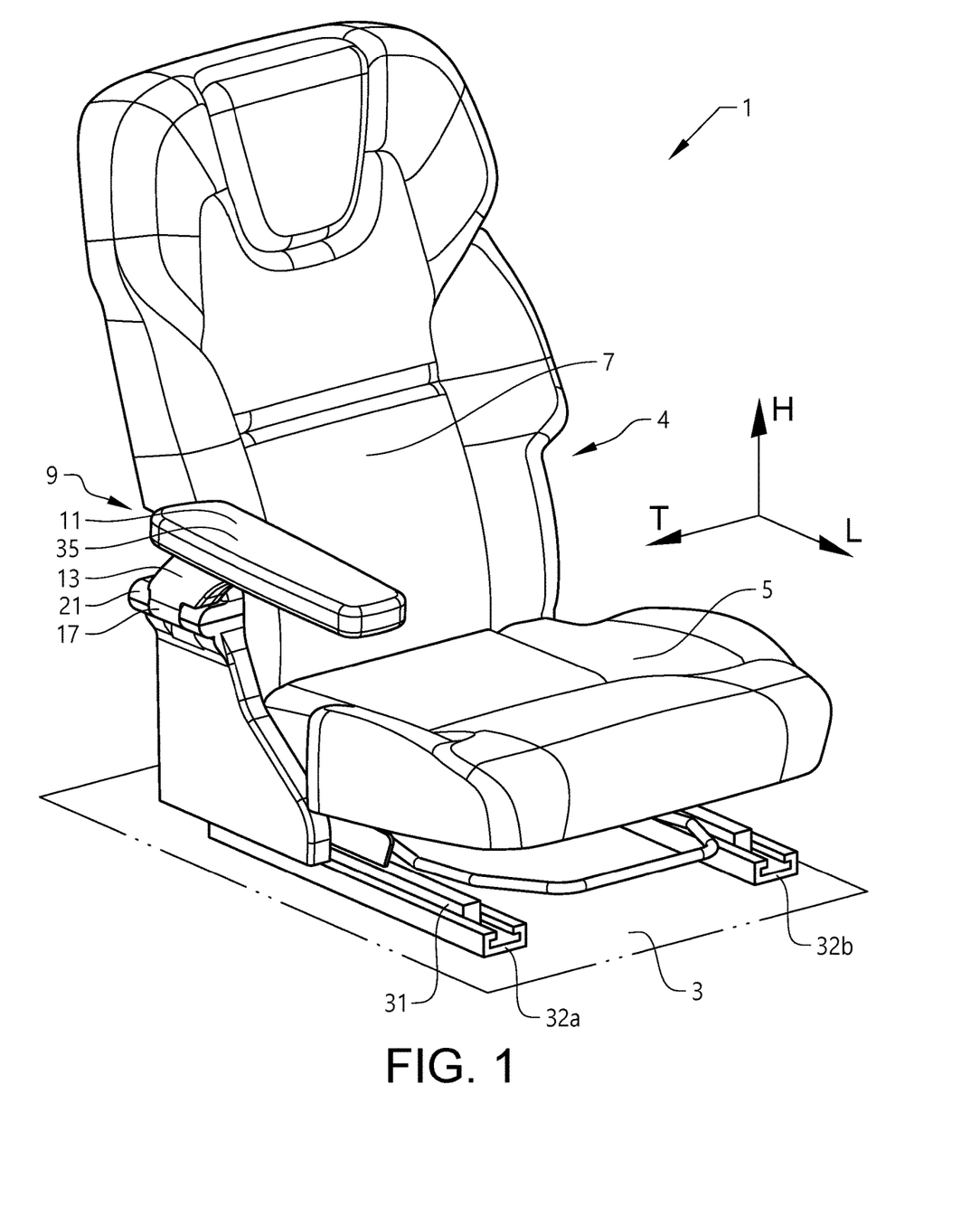
FIG. 1 illustrates a seat arrangement according to the invention with an armrest according to the invention in a use position.
Figure 2:
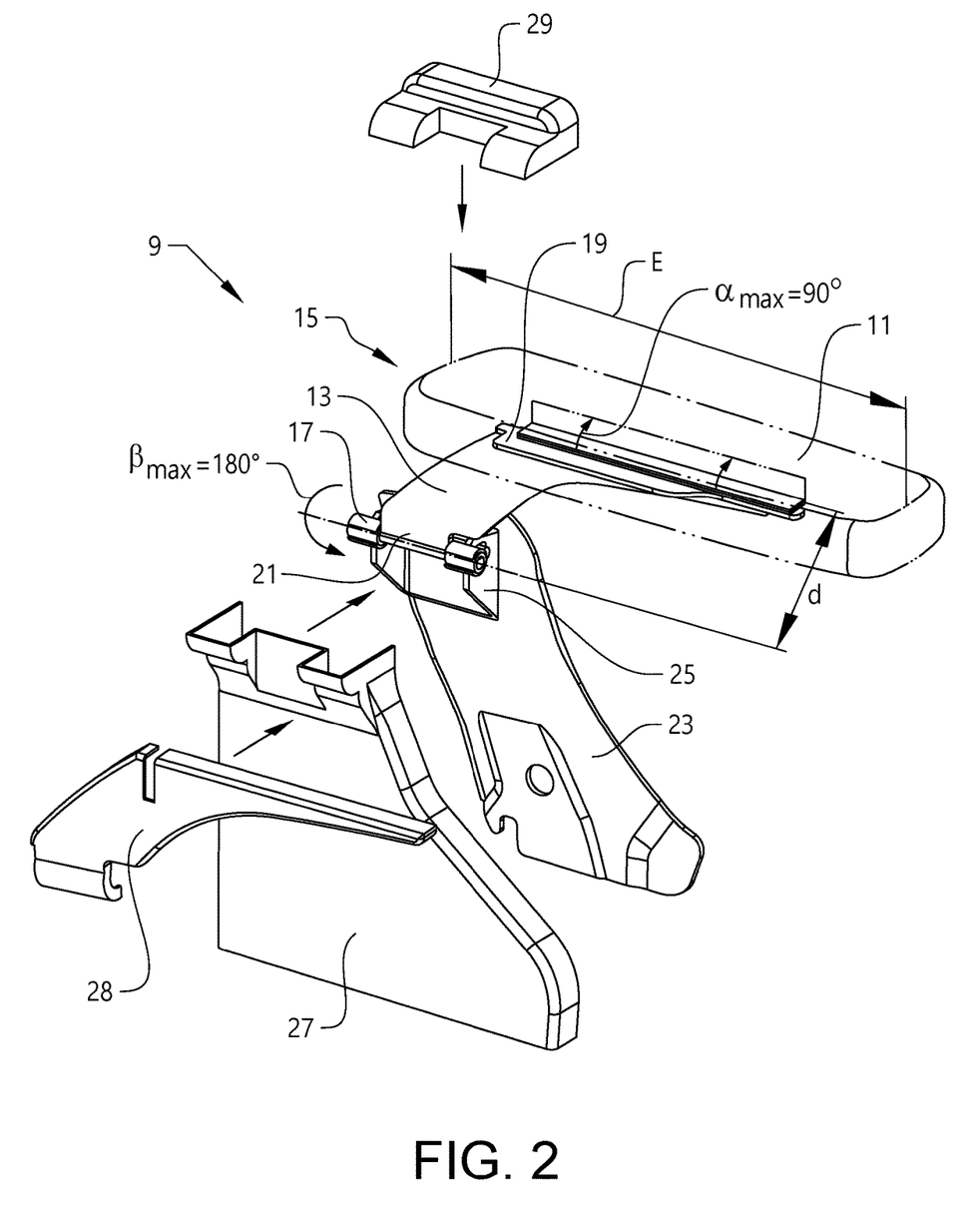
FIG. 2 is an exploded view of the armrest.
Figure 3:
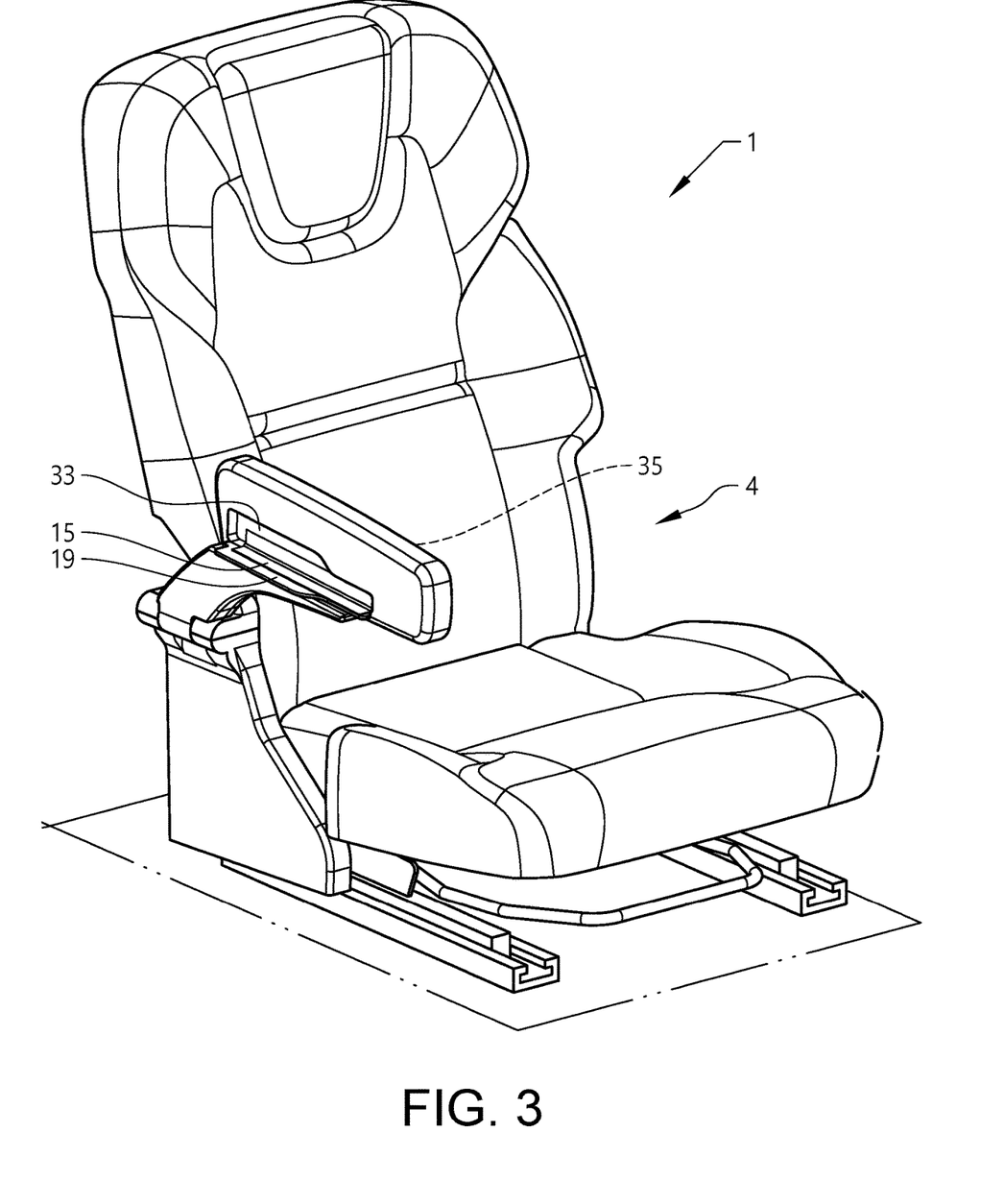
FIG. 3 illustrates the seat arrangement of FIG. 1 with the armrest having a rotated pad portion.
Figure 4:
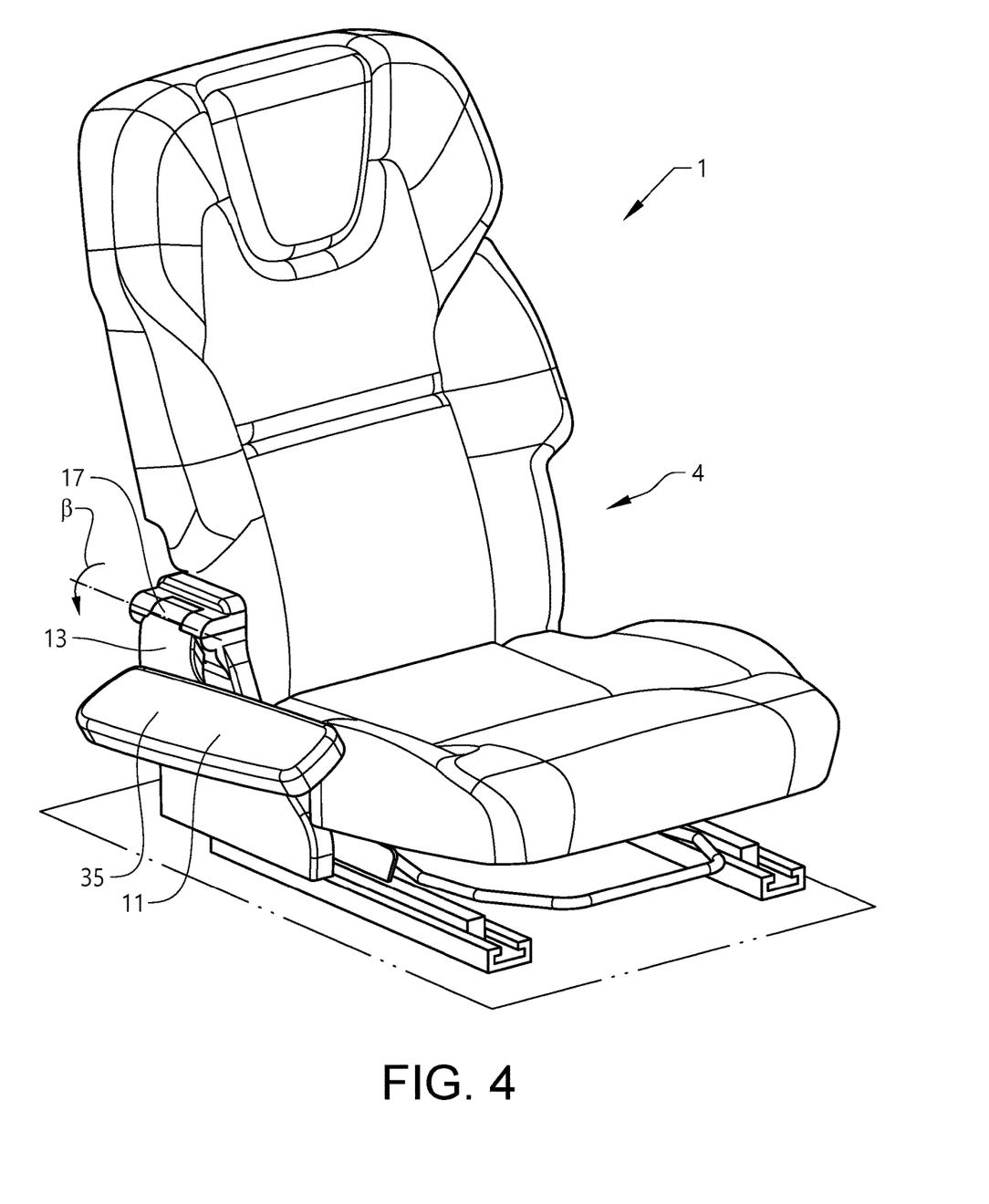
FIG. 4 illustrates the seat arrangement of FIG. 1 with the armrest during transition to a fold-away position.
Figure 5:
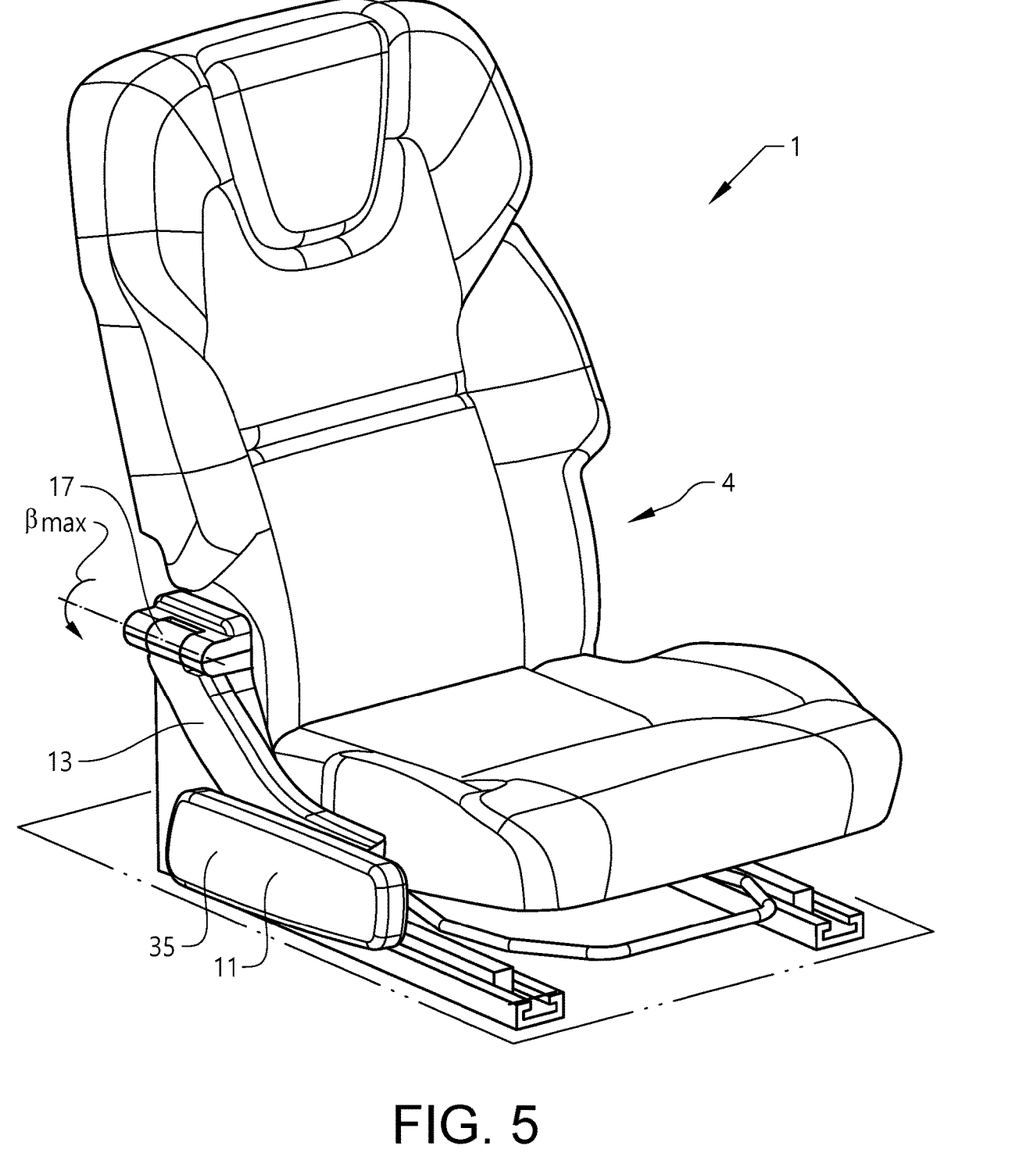
FIG. 5 illustrates the seat arrangement of FIG. 1 with the armrest in the fold-away position.

FIGS. 1-5 illustrate a vehicular seat arrangement 1 according to the invention when mounted in a vehicle, whereof only a floor 3 is indicated. The seat arrangement 1 comprises a vehicular seat 4 having a seat portion 5, intended to receive a bottom of a user of the seat arrangement 1, and a backrest 7, see FIG. 1. The seat arrangement 1 further comprises an armrest 9 according to a first embodiment of the invention. FIG. 2 shows an exploded view illustrating details of the armrest 9. The armrest 9 may assume a use position, as in FIG. 1, offering a comfortable support for an elbow and/or a forearm of the user of the seat arrangement 1, and a fold-away position, as illustrated in FIG. 5 and further described below, making it easier to access the seat 4 or to pass the seat arrangement 1 to e.g. access another seat row located behind the seat arrangement 1. The armrest 9 is displaceable between these two positions as is further described below with the help of FIGS. 3 and 4 showing various positions assumed during the displacement.

The armrest 9 comprises a pad portion 11, an arm portion 13, a first hinge 15, hidden from view within the pad portion 11 in FIG. 1, and a second hinge 17. The first hinge 15 rotatably connects the pad portion 11 and a first end portion 19 of the arm portion 13, see FIG. 2. The second hinge 17 rotatably connects a second end portion 21 of the arm portion 13, being opposite to the first end portion 19, to a recliner bracket 23 via a hinge bracket 25, whereof the recliner bracket 23 and the hinge bracket 25 are hidden behind covers 27, 28, 29 in FIG. 1 but visible in the exploded view of FIG. 2. The hinge bracket 25 is attached to the recliner bracket 23 and provides attachment for the second hinge 17. The recliner bracket 23 forms part of the seat 4. By using a hinge bracket 25, the armrest 9 according to the invention may easily be mounted to an existing vehicular seat by attaching the hinge bracket 25 to a portion of the seat, e.g. to the recliner bracket 23 as in the illustrated embodiment. The first hinge 15 and the second hinge 17 are interspaced by a smallest distance d, see FIG. 2, being at least 5 cm, preferably at least 10 cm, more preferably at least 15 cm. When the armrest 9 is in the use position, as illustrated in FIG. 1, the smallest distance d represents the vertical distance as seen in a height direction H of the vehicle.

In the illustrated embodiment, the first hinge 15 and the second hinge 17 have extension directions which are parallel to each other and also to a surface of the floor 3 of the vehicle. The extension directions are thereby parallel to a lower surface of a floor attachment portion 31 comprised in the seat 4, in this embodiment attached to rails 32a, 32b mounted to the floor 3, such that the seat 4 may be adjusted in a longitudinal direction of the vehicle. Further, the extension directions of the first hinge 15 and the second hinge 17 run in a length direction L of the seat arrangement 1 and thus also in the longitudinal direction of the vehicle.

In the illustrated embodiment, the first hinge 15 is accommodated in a cavity 33 of the pad portion 11, see FIG. 3, such that the first hinge 15 is hidden from view in the pad portion 11 during normal use. In the illustrated embodiment, the first hinge 15 is constituted by a single continuous hinge of the type known as a piano hinge. This is appropriate considering that the pad portion 11 is elongate along a longitudinal axis and thus has a relatively long extension E along the longitudinal axis, see FIG. 2, typically being in the range of from 10 to 50 cm or from 20 to 40 cm, the longitudinal axis of the pad portion 11 coinciding or substantially coinciding with the length direction L of the seat arrangement 1. However, other configurations of the first hinge 15 are also feasible, e.g. two or more shorter hinges. Further, the extension directions of the first hinge 15 and the second hinge 17 are parallel or substantially parallel to the longitudinal axis of the pad portion 11.

The first hinge 15 is configured to allow rotation of the pad portion 11 by a first maximum rotation angle $\alpha_{max}$ being about 90 degrees, from the use position of the armrest 9, in which the pad portion 11 has a horizontal or substantially horizontal support surface 35, see FIG. 1, to a substantially vertical position of the support surface 35 used in the fold-away position of the armrest 9, see FIG. 5. A locking mechanism is provided in order to secure the armrest 9 in the use position and the fold-away position. The locking mechanism 37 is further described below in conjunction with FIGS. 9-13.

The second hinge 17 is configured to allow rotation of the arm portion 13 by a second maximum rotation angle $\beta_{max}$ being about 180 degrees, from the use position of the armrest 9, in which the arm portion 13 extends vertically upwards or substantially vertically upwards from the second hinge 17, see FIGS. 1 and 2, to the fold-away position of the armrest 9, in which the arm portion 13 extends vertically downwards or substantially vertically downwards from the second hinge 17, see FIG. 5.

FIGS. 1, 3, 4 and 5 illustrate a transition from the use position, see FIG. 1, to the fold-away position of the armrest 9, see FIG. 5. Of course, the armrest 9 may also be displaced in the opposite way, i.e. from the fold-away position to the use position.

In the use position, as seen in FIG. 1, the support surface 35 of the pad portion 11 has a horizontal or substantially horizontal surface offering a comfortable support for the elbow and/or forearm of the user of the seat arrangement 1.

When the armrest 9 is to be folded away, the pad portion 11 is rotated by an angle α around the first hinge 15, in the illustrated embodiment being the first maximum rotation angle $\alpha_{max}$ being about 90°. Accordingly, the support surface 35 is moved to an essentially vertical position facing inwards, i.e. towards a body of the user of the seat arrangement 1, see FIG. 3. As further described below in conjunction with FIGS. 9-13, the pad portion 11 may be rotated in two steps, with the last step of the rotation, e.g. from 65° to 90° providing a movement which is used to unlock the locking mechanism.

In the next step of the transition, the arm portion 13 is rotated around the second hinge 17, see FIG. 4, to the fold-away position of the armrest 9, see FIG. 5. In this position of the armrest 9, the support surface 35 of the pad portion 11 faces outwards from the seat 4, i.e. away from the user of the seat arrangement 1, making it easier to pass the seat arrangement 1, e.g. in order to reach another seat row being located behind the illustrated seat 4. Since the first hinge 15 is accommodated within the cavity 33, the support surface 35 has a flat and continuous surface in the outwards-facing direction, which surface is the same as used for support of the elbow and/or forearm, cf. FIG. 1.

The fold-away position of the armrest 9 may be utilized to prevent a risk of a seat occupant being injured in a side impact by causing the armrest 9 to be automatically displaced to the fold-away position, in the event of a detected or imminent side impact or a roll-over accident. Purely as an example, the armrest 9 may be displaced by an actuator associated with a safety system of the vehicle to the fold-away position when the side force exceeds a preselectable level.

As an alternative or complement, the armrest 9 may, in case of a side impact or a roll-over accident, be folded away by the seat occupant himself/herself pressing on the armrest 9 with a force above a pre-selectable limit. Since the armrest 9 is folded away, the risk of potential injuries to the stomach, ribs and/or spine of the seat occupant is reduced or preferably avoided.

Compared to the use position, in the fold-away position of the armrest 9, the pad portion 11 has been rotated by a second rotation angle β, which may be the same as the second maximum rotation angle $\beta_{max}$ being about 180°.

Figure 6:
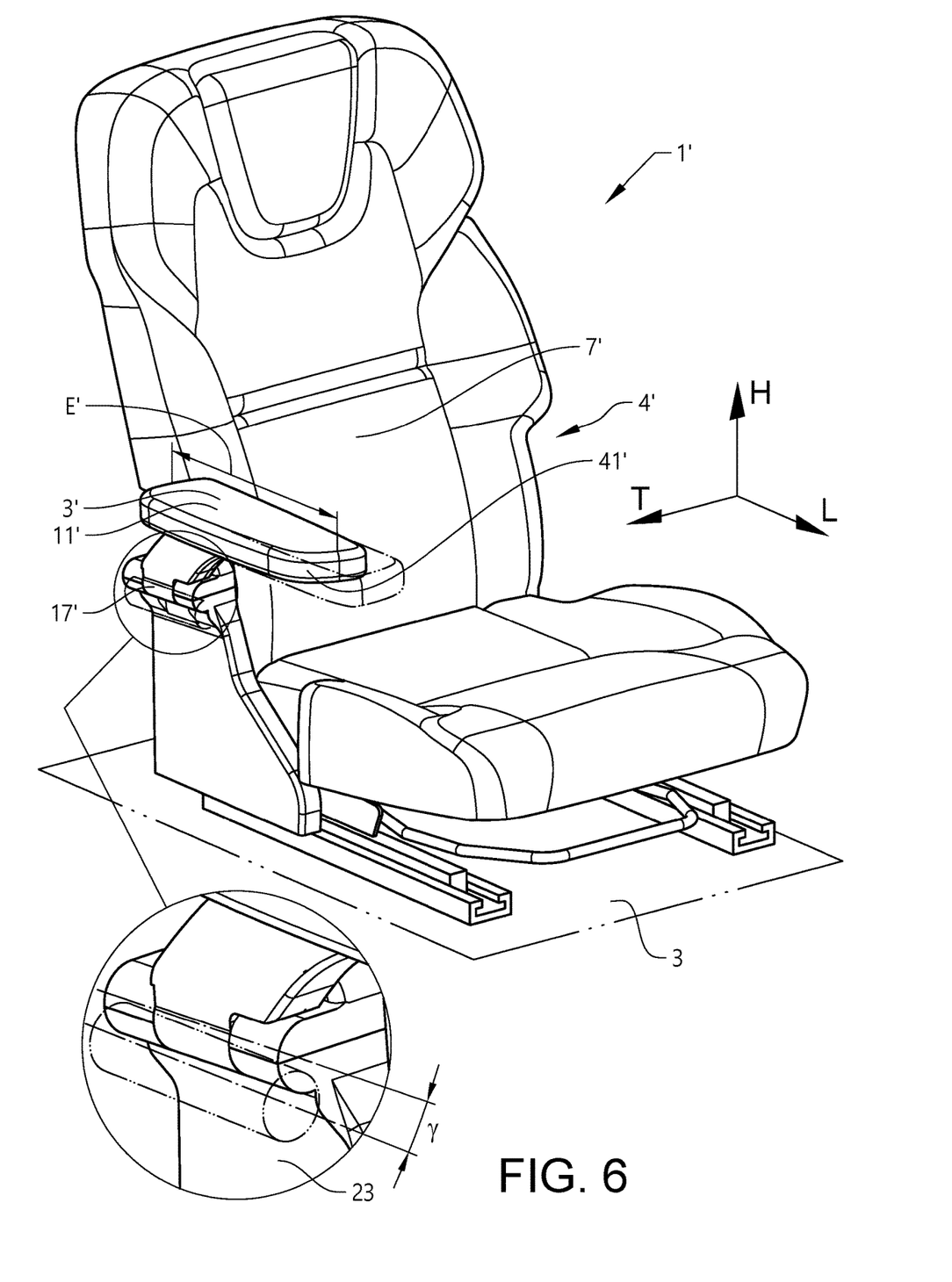
FIG. 6 illustrates another seat arrangement with an armrest according to a second embodiment of the invention in the use position.
Figure 7:
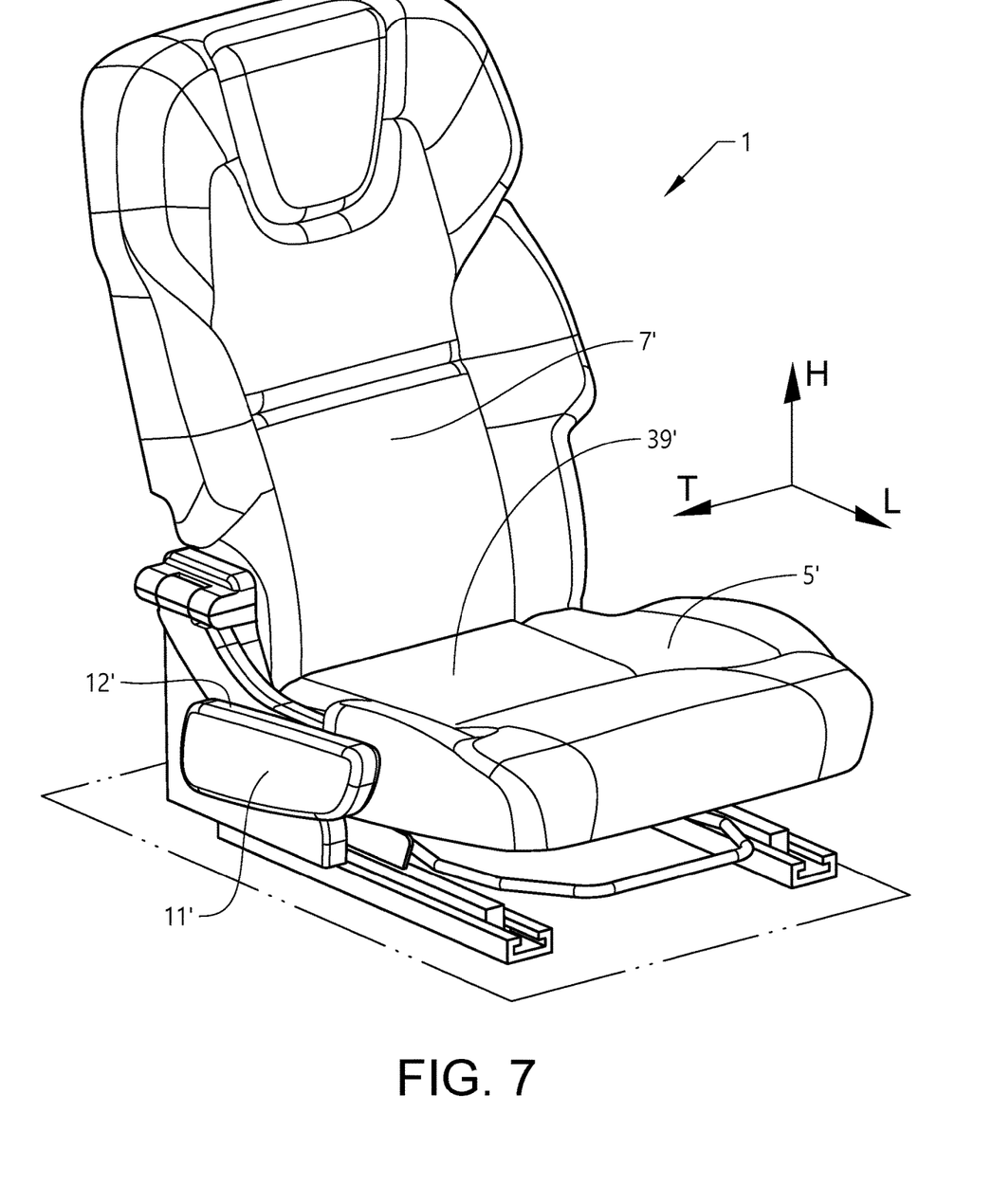
FIG. 7 illustrates the seat arrangement of FIG. 6 with the armrest in the fold-away position.
Figure 8:
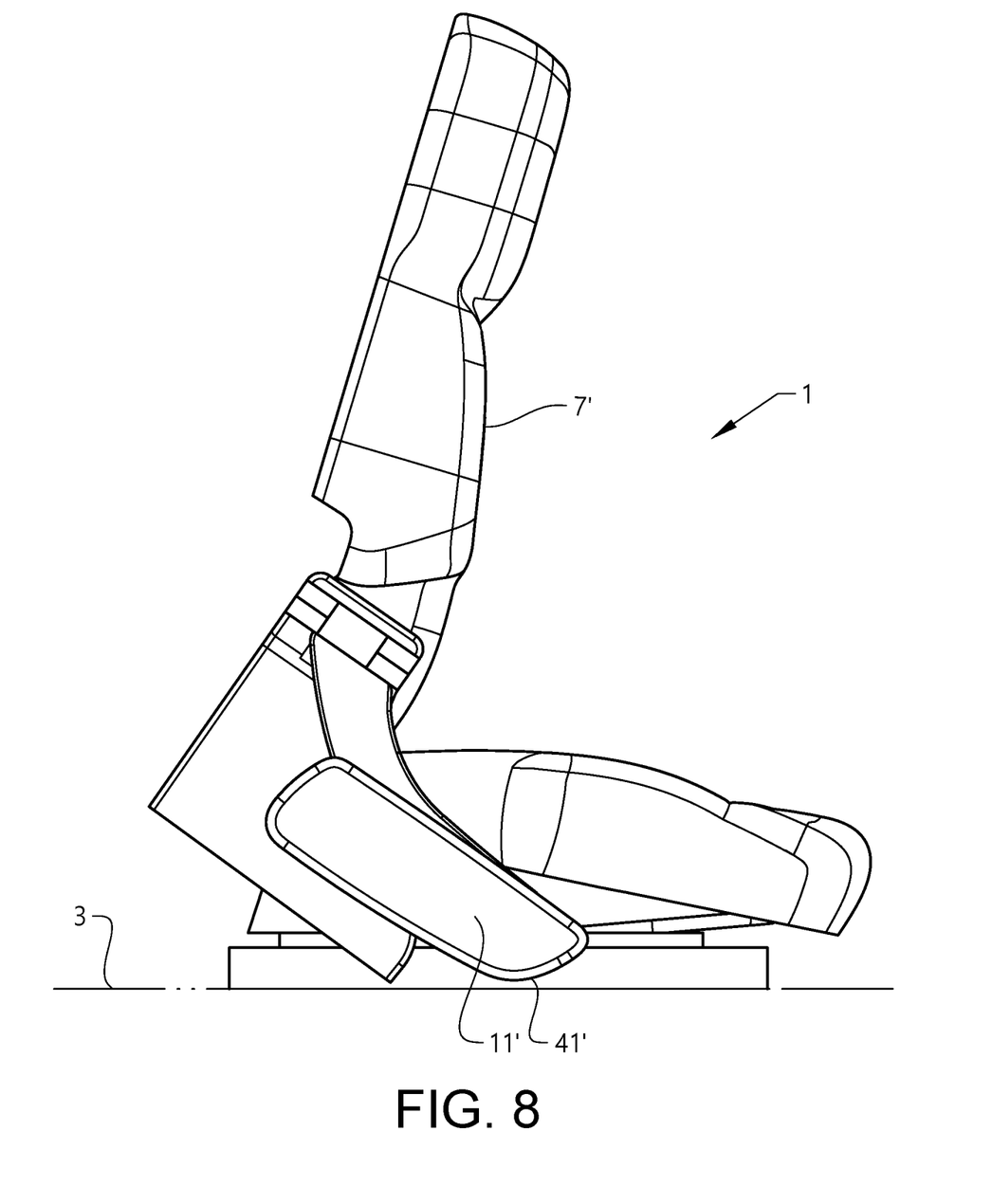
FIG. 8 illustrates the seat arrangement of FIGS. 6 and 7 when the seat is folded forwards.

FIGS. 6-8 illustrate a second embodiment of the armrest 9' according to the invention comprised in another seat arrangement 1' according to the invention. Most components of the seat 4' of the other seat arrangement 1' and of the armrest 9' are similar to the seat 4 and the armrest 9 of the seat arrangement 1 described above with reference to FIGS. 1-5 and will not be described again.

One differentiating feature when comparing the two embodiments is that the second hinge 17' is located higher up on the recliner bracket 23 than that of the first embodiment as seen in relation to the floor 3, the location of which is indicated by dashed lines in the detailed view of FIG. 6. Further, the second hinge 17' is angled by a slight angle λ in relation to the second hinge 17 of the first embodiment and thus also to the floor 3. The angle λ is between 0 and 10°, typically between 2° and 6°, herein illustrated as 4°. As a consequence of the slight angle λ, in the fold-away position of the armrest 9', a side surface 12' of the pad portion 11' is located aligned with an upper surface 39' of the seat portion 5' of the seat arrangement 1', see FIG. 7.

Other differentiating features are that the extension E' of the pad portion 11' in the length direction L is less than for the first embodiment, indicated by a dashed line in FIG. 6 and that the pad portion 11' is shaped having a chamfered outer corner 41', see FIG. 6.

Utilizing one or more of these differentiating features may be advantageous in case the seat arrangement 1' is provided with a backrest 7' which is forwards foldable, e.g. by the backrest 7' being pivotable around a bolt in the recliner bracket 23, by an angle in the range of 20-60 degrees, or 30-50 degrees, e.g. about 40 degrees, see FIG. 8. Thereby the backrest 7' can be folded without the pad portion 11' being hindered by the floor 3, due to the pad portion 11 being shaped such that it does not project lower than a lowest part of the seat arrangement 1'. Hence, a lowest portion of the pad portion 11' is at a vertical level being higher than or equal to a lowest part of the seat arrangement 1'. This provides easier access to an additional seat arrangement being located behind the illustrated seat arrangement 1'.

These differentiating features may be used in combination, as in the illustrated second embodiment of FIGS. 6-8, or may be used separately.

As mentioned above, a locking mechanism 37 is provided to be able to secure the armrest 9 in the use position and the fold-away position. The locking mechanism 37 is described below with reference to FIGS. 9-13.

Figure 9:
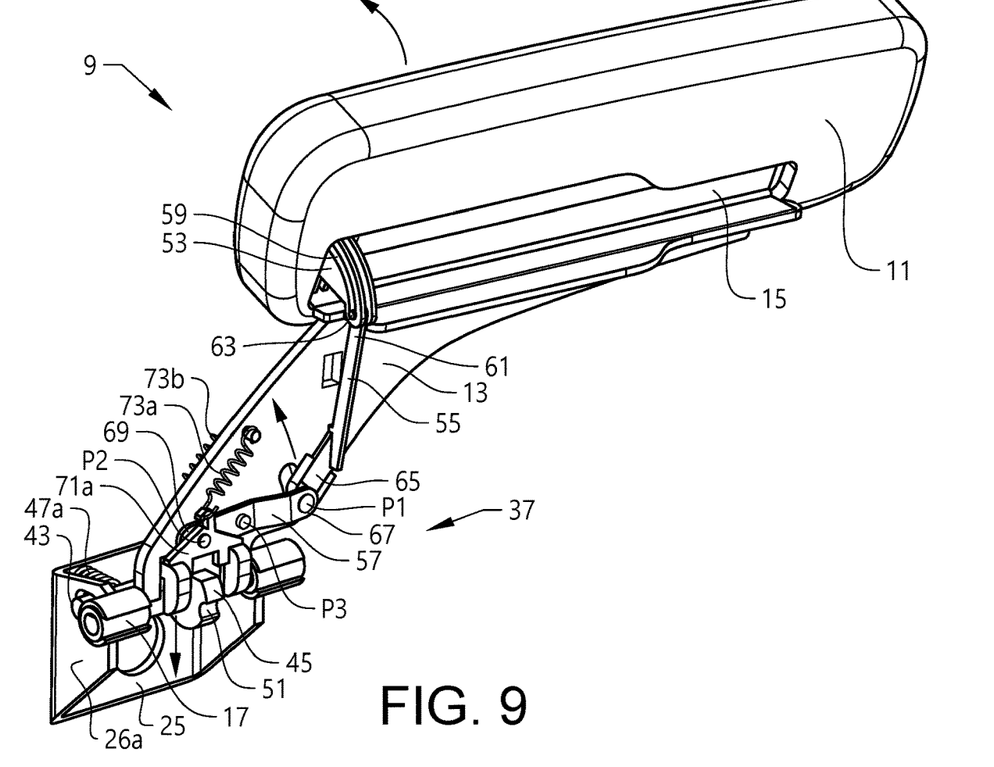
FIG. 9 illustrates the armrest of FIG. 1 showing a locking mechanism, with the pad portion in an intermediate position and the locking mechanism in a locked state.

The locking mechanism 37 extends between the pad portion 11, along the arm portion 13 to the second hinge 17, see FIG. 9. The locking mechanism 37 may assume a locked state, in which the arm portion 13 is directed upwards or downwards, and an open state, in which the arm portion 13 is free to rotate. When the armrest 13 is in the use position or in the fold-away position, the second hinge 17 is held in the locked state.

Figure 10:
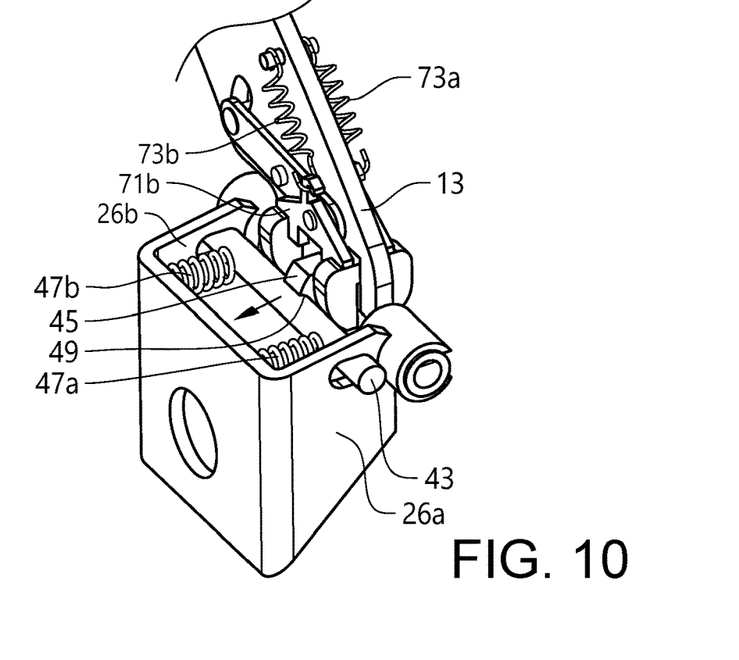
FIG. 10 illustrates a detailed view of the armrest of FIG. 9 from another perspective.
Figure 11:
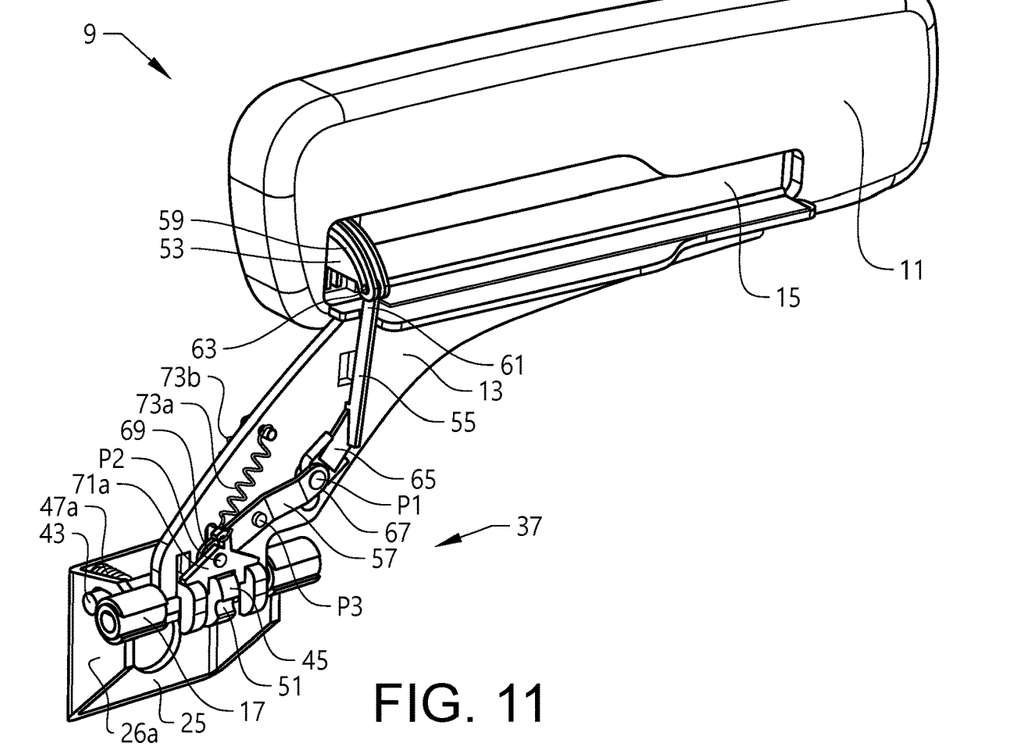
FIG. 11 illustrates the armrest of FIG. 9 with the locking mechanism in an unlocked state.
Figure 12:
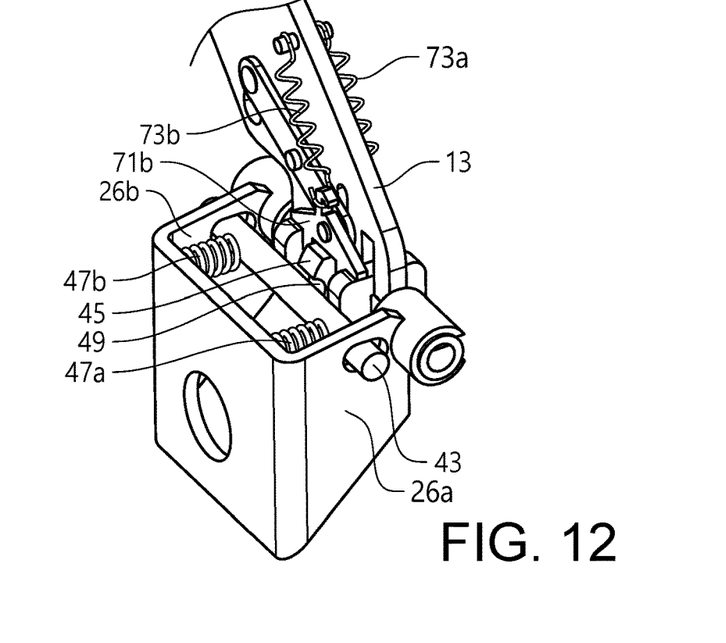
FIG. 12 illustrates a detailed view of the armrest of FIG. 11 from another perspective.

The locking mechanism 37 comprises a locking pin 43 mounted between a pair of flanges 26a, 26b of the hinge bracket 25, see FIG. 10. The locking pin 43 is adapted to cooperate with a locking member 45, which is located on the second end portion 21 of the arm portion 13. The locking pin 43 is biased towards the locking member 45 by means of a first biasing means, depicted as a pair of springs 47a, 47b. The locking member 45 comprises a first indentation 49, facing the hinge bracket 25 and thus hidden from view in FIG. 9 but seen in FIG. 10, and a second indentation 51, seen in FIG. 9 but hidden from view in FIG. 10. The first indentation 49 and the second indentation 51 are located at opposite sides of the locking member 45 and are configured to be able to receive the locking pin 43. When the locking pin 43 is located in the first indentation 49, this corresponds to the second hinge 17 being locked with the arm portion 13 directed upwards. When the locking pin 43 is located in the second indentation 51, this corresponds to the second hinge 17 being locked with the arm portion 13 directed downwards. The outer surface profile of the locking member 45 between the first and second indentations 49, 51 is rounded, see FIG. 9, such that the locking member 45 may rotate together with the arm portion 13, as described below, even though the locking pin 43 presses against the locking member 45. The locking pin 43 thereby remains in contact with the rounded profile facing the locking pin 43 during the rotation.

The locking mechanism 37 further comprises a bracket portion 53, a first link arm 55 and a second link arm 57. The bracket portion 53 is attached to the pad portion 11. The bracket portion 53 comprises an arcuate guide, exemplified as a slot 59. Hence, the bracket portion 53 forms a first portion of the locking mechanism 37 attached to the pad portion 11. A first end 61 of the first link arm 55 is slidably arranged in relation to the bracket portion 53. In the illustrated embodiment, a protruding pin 63 at the first end 61 of the first link arm 55 is configured to slide in the arcuate slot 59. The arcuate shape of the slot 59 is adapted to the rotation of the pad portion 11, such that the first end 61 can slide in the slot 59 when the pad portion 11 is rotated about the first hinge 15.

A second opposite end 65 of the first link arm 55 is pivotally connected at a first pivot axis P1 to a first end 67 of the second link arm 57. A second opposite end 69 of the second link arm 57 is connected to an unlock slider 71a by a second pivot axis P2, which is configured to allow a pivoting/sliding movement, such that a rotation of the second link arm 57 is transferable to a straight movement of the unlock slider 71a. Hence, there is an elongated hole in the second link arm 57 allowing this movement. A central region of the second link arm 57 is pivotally connected to the arm portion 13 at a third pivot axis P3. A second biasing means, depicted as a spring 73a, is attached to the arm portion 13 and strives to hold the unlock slider 71a in a position in which the unlock slider 71a does not influence the locking pin 43, e.g. by being out of contact therewith. On the other side of the arm portion 13, a second spring 73b biases a second unlock slider 71b which is also connected to the second pivot axis P2 in a corresponding way. Hence, the unlock slider 71a and the second unlock slider 71b are configured to move in synchrony. Although it is sufficient to have only one spring and one unlock slider, it is preferred to have two for better balance.

The locking pin 43 and the locking member 45 form a second portion of the locking mechanism 37 located at the second hinge 17, with the first link arm 55, the second link arm 57 and the unlock sliders 71a, 71b forming a linkage system connecting the first and second portions of the locking mechanism 37. By utilizing a locking mechanism 37 as described herein, a rotation of the pad portion 11 about the first hinge 15, made by e.g. a user of the seat arrangement 1, will influence a possible movement at the second hinge 17.

When the armrest 11 is in the use position, as in FIG. 1, the locking mechanism 37 is in the locked state.

FIG. 9 illustrates the pad portion 11 being rotated to an intermediate position, cf. also FIG. 3, in which the locking mechanism 37 still assumes the locked state, but yet allows easy passing of the seat arrangement 1. In order to reach the intermediate position of the pad portion 11, the protruding pin 63 at the first end 61 of the first link arm 55 has been displaced by sliding in the guiding arcuate slot 59. The first link arm 55 and the components of the locking mechanism 37 being located below have yet not moved. The length of the slot 59 determines the maximum angle about which the pad portion 11 may be rotated, before beginning transiting to the unlocked state, here corresponding to a 65° rotation.

In the locked state of the locking mechanism 37, corresponding to the use position of the armrest 9 with the pad portion 11 being horizontal or substantially horizontal, and during the rotation of the pad portion 11 to the intermediate position, the locking pin 43 is held in the first indentation 49 of the locking member 45 by means of the first biasing means, i.e. the springs 47a, 47b, see FIG. 10, showing details of the armrest 9 of Figure from another perspective.

In order to facilitate rotation of the arm portion 13 of the armrest 9, the locking pin 43 is to be moved out of the first indentation 49 against the force of the first biasing means 47a, 47b. When the pad portion 11 is rotated the remaining angle from the intermediate position, the remaining angle here being at about 25°, to the first maximum rotation angle $\alpha_{max}$, being about 90° and described above in conjunction with FIG. 2, the protruding pin 63 has already reached the end of the slot 59 and therefore moves together with the pad portion 11 during its rotation, see FIG. 11. Accordingly, the first link arm 55 including the first pivot axis P1 is moved upwards and the second link arm 57 rotates around the third pivot axis P3. This causes the unlock sliders 71a, 71b to move downwards via rotation about the second pivot axis P2 and sliding in the elongated hole. Eventually, the unlock sliders 71a, 71b reaches the locking pin 43 and pushes the locking pin 43 in a direction away from the locking member 45, see FIG. 12, and thereby out of the first indentation 49. The locking mechanism 37 then assumes its unlocked state. Thereafter the arm portion 13 is free to rotate.

Due to the rounded outer surface profile of the locking member 45 between the first and second indentations 49, 51, the locking member 45 may rotate together with the arm portion 13 even though the locking pin 43 presses against the locking member 45.

When the locking pin 43 reaches the second indentation 51, a movement resulting from the rotation of the locking member 45 together with the arm portion 13, the locking pin 43 will enter the second indentation 51 due to the force from the first biasing means 47a, 47b. This is possible since the unlock sliders 71a, 71b have been moved away from the locking pin 43 by the pad portion 11 being rotated away from the first maximum rotation angle $\alpha_{max}$ to the intermediate position. The protruding pin 63 moves in the slot 59, thereby influencing the first link arm 55, the second link arm 57 and the unlock sliders 71a, 71b by means of the pivot axes P1, P2, P3.

Figure 13:
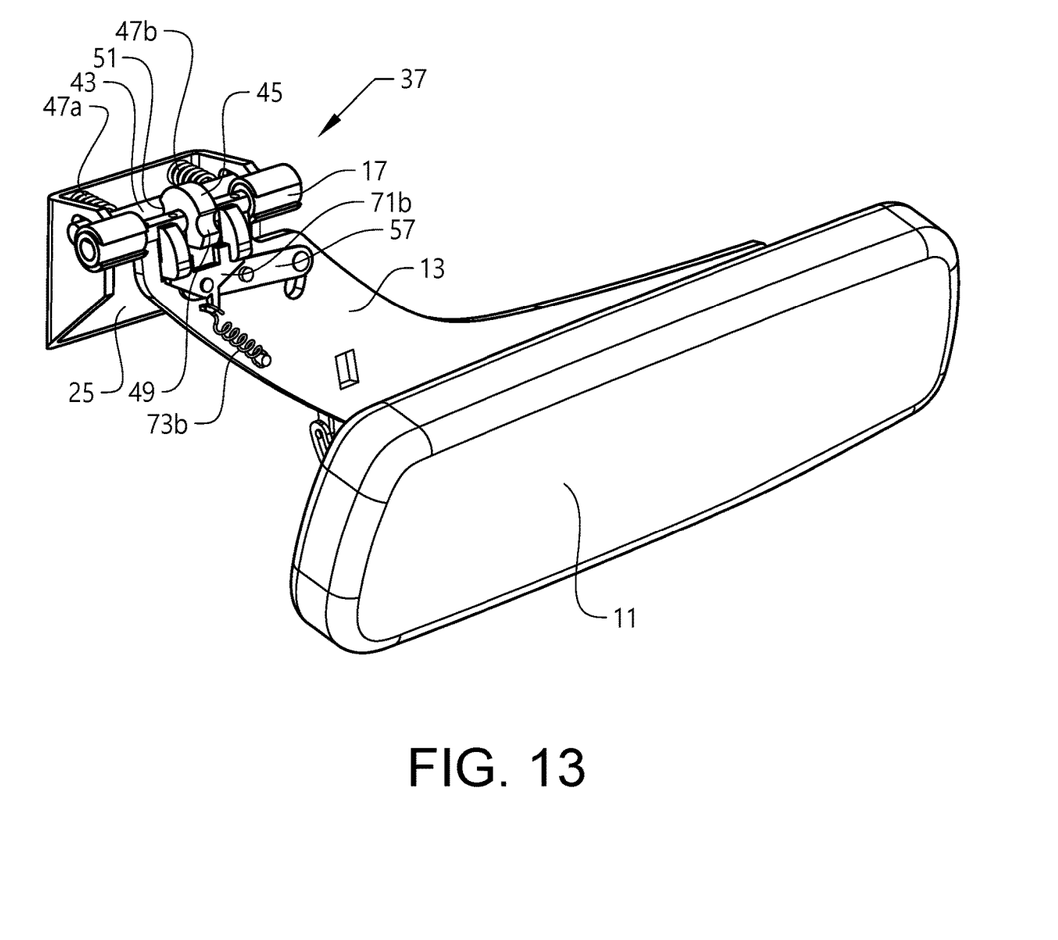
FIG. 13 illustrates the armrest of FIG. 9 in the fold-away position showing the locking mechanism in the locked state.

In the fold-away position of the armrest 9, see FIG. 13, the pad portion 11 is held in the intermediate position by being biased by the second biasing means 73a, 73b. Hence, the locking mechanism 37 is in its locked state.

To unlock the locking mechanism 37 when in the fold-away position of the armrest 9, the pad portion 11 is rotated to the first maximum rotation angle $\alpha_{max}$ being about 90 degrees and the locking pin 43 is moved out of the second indentation 51 of the locking member 45 in a corresponding way as described above for the first indentation 49.

The described locking mechanism 37 represents one way of locking and unlocking the armrest 9. Alternatively, a release button or a pull strap may be provided for locking and unlocking the armrest 9.

As a further alternative, the armrest may be biased towards the use position and the fold-away position, respectively. In that case there would be no firm locked state of the locking mechanism. Instead, an increased force would be used to displace the armrest from the use position and the fold-away position, respectively.

It would also be possible to perform the transition of the armrest between the use position and the fold-away position electrically.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An armrest (9) for a seat arrangement (1) of a vehicle or a vessel, said armrest (9, 9') being foldable between a use position and a fold-away position, said armrest (9, 9') comprising:
    a pad portion (11, 11'),
    an arm portion (13) having a first end portion (19) and a second end portion (21), being opposite to said first end portion (19),
    a first hinge (15) having a first hinge axis, configured to rotatably connect said pad portion (11, 11') and said first end portion (19) of said arm portion (13), and
    a second hinge (17, 17') having a second hinge axis, located at said second end portion (21) of said arm portion (13) and configured to rotatably connect said second end portion (21) of said arm portion (13) to said seat arrangement (1, 1'), said pad portion (11, 11') being elongate along a longitudinal axis (E), said first hinge axis and said second hinge axis have extension directions being parallel or substantially parallel to said longitudinal axis (E) of said pad portion (11, 11'), wherein said first hinge (15) is configured for a first maximum rotation angle $\alpha_{max}$, with $70° < \alpha_{max} < 110°$.

2. The armrest (9, 9') according to claim 1, wherein said extension directions of said first hinge axis and said second hinge axis differ by less than 20 degrees.

3. The armrest (9, 9') according to claim 1, wherein said first maximum rotation angle $\alpha_{max}$ fulfils $80° < \alpha_{max} < 100°$.

4. The armrest (9, 9') according to claim 1, wherein said pad portion (11, 11') comprises a cavity (33), said first hinge (15) axis being accommodated within said cavity (33).

5. The armrest (9, 9') according to claim 1, wherein said second hinge (17, 17') is configured for a second maximum rotation angle $\beta_{max}$, with $150° < \beta_{max} < 190°$.

6. The armrest (9, 9') according to claim 1, wherein said first hinge (15) and said second hinge (17, 17') are interspaced by a smallest distance being at least 5 cm.

7. The armrest (9, 9') according to claim 1, comprising a locking mechanism (37) configured to secure said armrest (9, 9') in at least one of said use position and said fold-away position.

8. The armrest (9, 9') according to claim 7, wherein said locking mechanism (37) comprises a first portion (53) located at said pad portion (11, 11') of said armrest (9, 9'), a second portion (43, 45) operating at said second hinge (17, 17') and a linkage system (55, 57, 71a, 71b) connecting said first and second portions.

9. The armrest (9, 9') according to claim 7, comprising said locking mechanism (37) configured to secure said armrest (9, 9') in both of said use position and said fold-away position.

10. The armrest (9, 9') according to claim 1, wherein said armrest (9, 9') further comprises a hinge bracket (25), said second hinge (17, 17') rotatably connecting said second end portion (21) of said arm portion (13) to said hinge bracket (25), said hinge bracket (25) being configured for attachment to said seat arrangement (1, 1').

11. A seat arrangement (1, 1') for a vehicle or a vessel, said seat arrangement (1, 1') comprising a seat (4) and at least one armrest (9, 9') according to claim 1, said armrest (9, 9') being directly or indirectly attachable to said seat (4), said seat (4) comprising a seat portion (5) and a backrest (7, 7').

12. The seat arrangement (1, 1') according to claim 11, wherein said armrest (9, 9') is attached to a component of said seat arrangement (1, 1') being independent of said backrest (7, 7').

13. The seat arrangement (1, 1') according to claim 12, wherein said armrest (9, 9') is attached to one more more of a recliner bracket (23), a seat basin, a seat frame, and a seat rail of said seat arrangement (1, 1').

14. The seat arrangement (1, 1') according to claim 11, wherein said extension directions of said first hinge axis (15) and said second hinge axis (17, 17') are substantially in or in a length direction (L) of said seat arrangement (1, 1').

15. The seat arrangement (1, 1') according to claim 11, wherein said pad portion (11, 11') of said armrest (9, 9') in said fold-away position extends in a direction being parallel or substantially parallel to a floor attachment portion comprised in said seat arrangement (1, 1').

16. The seat arrangement (1, 1') according to claim 15, wherein said pad portion (11, 11') of said armrest (9, 9') in said fold-away position extends in said direction being parallel or substantially parallel to a seat rail (32a, 32b) of said floor attachment portion of said seat arrangement (1, 1').

17. The seat arrangement (1, 1') according to claim 11, wherein a side surface (12') of said pad portion (11') when said armrest (9') is in said fold-away position, extends in a direction being parallel or substantially parallel to an upper surface (39') of said seat portion (5).

18. The seat arrangement (1, 1') according to claim 17, wherein said side surface (12') of said pad portion (11') when said armrest (9') is in said fold-away position, extends in said direction being parallel or substantially parallel to said upper surface (39') of said seat portion (5) and is aligned with said upper surface (39').

19. The seat arrangement (1, 1') according to claim 11, wherein said backrest (7') is forwards foldable to a folded position, said pad portion (11') being shaped such that when said armrest (9') is in said fold-away position and said backrest (7') is in said folded position, a lowest portion of said pad portion (11') is at a vertical level being higher than or equal to a lowest part of said seat arrangement (1').

* * * * *